United States Patent [19]

Urban

[11] 4,368,868
[45] Jan. 18, 1983

[54] BREAK-AWAY REARVIEW MIRROR AND BRACKET

[76] Inventor: Milfred W. Urban, 1819 N. Edwards, Wichita, Kans. 67203

[21] Appl. No.: 183,366

[22] Filed: Sep. 2, 1980

[51] Int. Cl.³ .................... F16M 13/00; A47G 1/24
[52] U.S. Cl. ................... 248/549; 248/475 B; 248/479
[58] Field of Search .................. 248/549, 475 B, 478, 248/479, 480, 487

[56] References Cited

U.S. PATENT DOCUMENTS

| | | | |
|---|---|---|---|
| 2,939,364 | 6/1960 | Doswell et al. | 248/479 |
| 3,408,136 | 10/1968 | Travis | 248/479 |
| 3,599,926 | 8/1971 | Takahashi | 248/549 |
| 3,642,245 | 2/1972 | Wohnlich | 248/475 B |
| 3,730,474 | 5/1973 | Bowers | 248/475 B |
| 3,887,156 | 6/1975 | Hugonnier | 248/549 |
| 3,934,807 | 1/1976 | Boutin | 248/478 |
| 3,985,325 | 10/1976 | Ginsburg et al. | 248/549 |
| 4,166,651 | 9/1979 | van den Brink et al. | 248/487 |
| 4,218,036 | 8/1980 | Pitkanen | 248/475 B |
| 4,252,290 | 2/1981 | Willey | 248/549 |

FOREIGN PATENT DOCUMENTS

| | | | |
|---|---|---|---|
| 871782 | 6/1961 | United Kingdom | 248/475 B |
| 1132384 | 10/1968 | United Kingdom | 248/549 |

Primary Examiner—Victor N. Sakran
Attorney, Agent, or Firm—John H. Widdowson

[57] ABSTRACT

A break-away mirror having a mirror, a mirror bracket attaches to the mirror, a molded synthetic resin bracket, and a nylon nut for attaching the mirror bracket to the molded bracket to hold the mirror in an upright position. A mount bracket connects to the molded bracket to mount the combined mirror-mirror bracket-molded bracket on an automobile or the like. The combined mirror-mirror bracket breaking-away from the molded synthetic resin bracket upon impact. A process for preparing a break-away mirror and mirror bracket wherein the mirror is attached to the mirror bracket.

8 Claims, 6 Drawing Figures

BREAK-AWAY REARVIEW MIRROR AND BRACKET

BACKGROUND OF THE INVENTION

1. Field of the Invention

This invention is related to a break-away mirror and bracket.

2. Description of the Prior Art

U.S. Pat. No. 3,642,245 by Wohnlich and U.S. Pat. No. 3,934,807 by Boutin, both disclose truck type side view mirrors. U.S. Pat. No. 3,599,926 by Takahashi discloses a break-away mirror bracket wherein a frangible plate is connected by means of a bolt to the vehicle body and which plate will break upon impact of the mirror with a solid object allowing the mirror to break-away from the body of the vehicle. U.S. Pat. No. 3,887,156 by Hugonnier discloses an outside rearview mirror for a vehicle wherein the bracket mount is constructed in such a way that if the mirror engages a solid object, it will be separated from the bracket mounted on the vehicle. None of the foregoing prior art discloses the particular break-away mirror of this invention.

SUMMARY OF THE INVENTION

It is therefore an object of this invention to provide a break-away mirror.

It is another object of this invention to provide a break-away mirror in combination with a convex and flat mirror.

The foregoing objects are achieved by the practice of this invention. Broadly, the present invention accomplishes its desired object by providing a break-away rearview mirror comprising a mirror means and a mirror bracket means attached to the mirror means; a molded synthetic resin bracket means; and a means for attaching the mirror bracket means to the molded bracket means to hold the mirror means in an upright position. A mounting bracket means connects to the molded bracket means to mount the combined mirror means-mirror bracket means-molded bracket means on an automobile. The combined mirror means-mirror bracket means breaking-away from the molded synthetic resin bracket means upon impact. The process for preparing a break-away mirror and mirror bracket wherein the mirror is attached to the mirror bracket comprising attaching the mirror bracket to a molded synthetic resin bracket means; and connecting a mounting bracket means to the molded bracket means for mounting the combined mirror-mirror bracket-molded bracket on an automobile, truck, or the like.

DETAILED DESCRIPTION OF THE INVENTION

Figure 5:
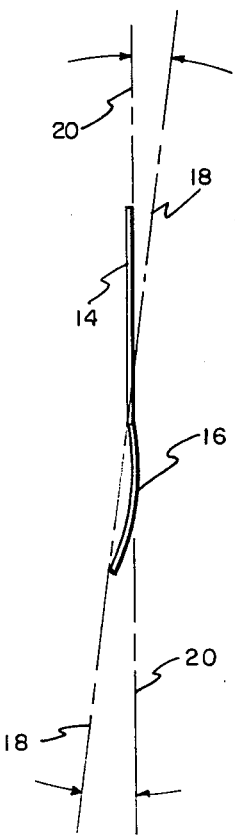
FIG. 5 is a side elevational view of a flat mirror and convex mirror disclosing a preferred angle $\alpha$ between the flat mirror plane and the chord plane of the convex mirror.
Figure 6:
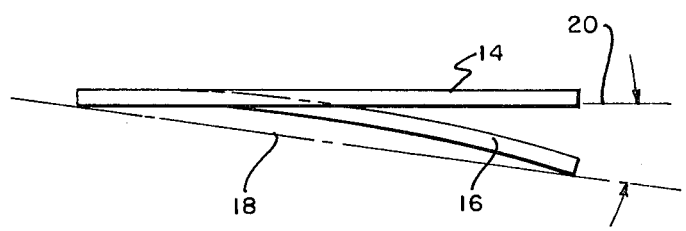
FIG. 6 is a side elevational view of a combined flat mirror and convex mirror and disclosing a preferred angle $\alpha$ between the flat mirror plane and the chord plane of the convex mirror.

Referring in detail now to the drawings, wherein similar parts of the invention are identified by like reference numerals, there is seen a break-away mirror, generally illustrated as 10, having a mirror frame 12 preferably holding a flat mirror 14 and a convex mirror 16 (see FIGS. 5 and 6) contiguous to an end thereof. In a preferred embodiment, I have discovered that a chord plane 18 of the convex mirror 16 should form an angle $\alpha$ between about 1 degree and 10 degrees with a plane 20 of the flat mirror 14. The combination flat mirror 14 and convex mirror 16 provides for increased areas of vision.

Figure 1:
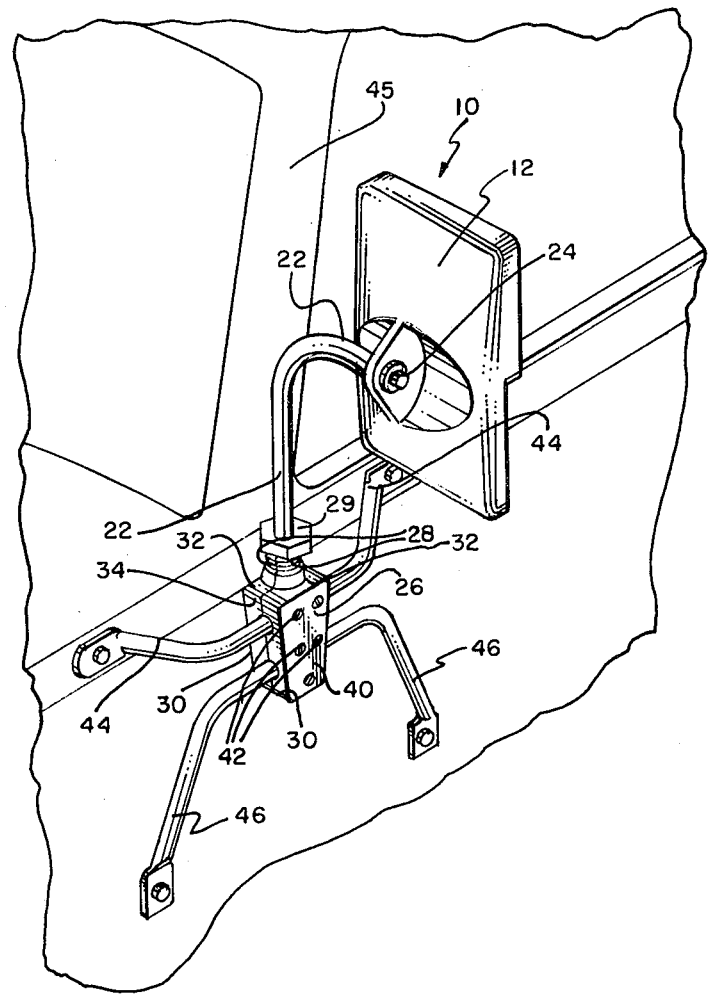
FIG. 1 is a perspective view of a preferred embodiment of the invention attached to an automobile.
Figure 2:
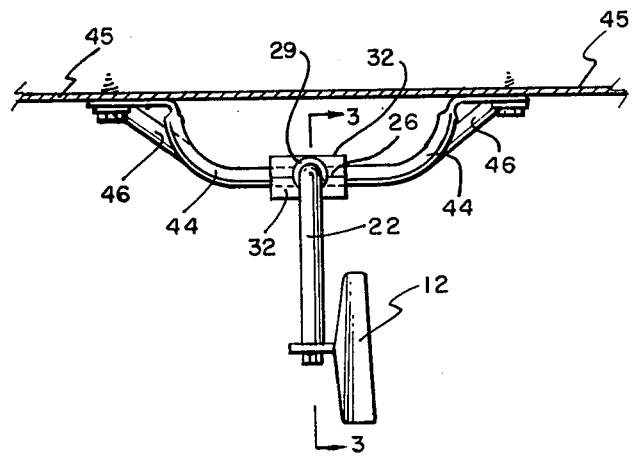
FIG. 2 is a top plan view of the invention.
Figure 3:
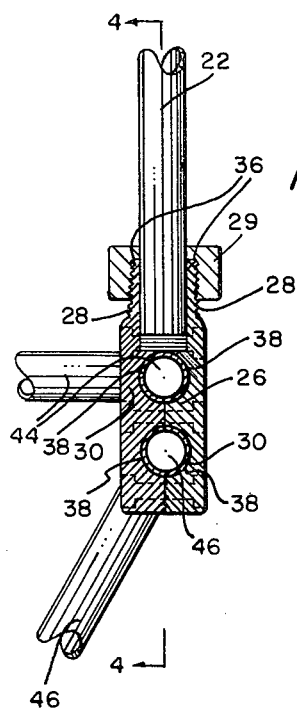
FIG. 3 is a vertical sectional view taken in direction of the arrows along the plane of line 3—3 in FIG. 2.
Figure 4:
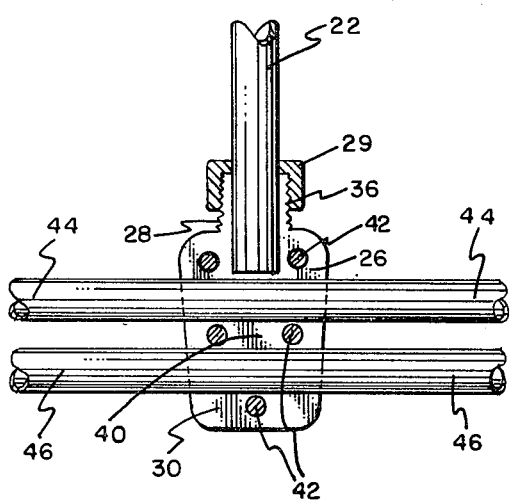
FIG. 4 is a vertical sectional view taken in direction of the arrows along the plane of line 4—4 in FIG. 3.

A mirror bracket 22 (preferably goosenecked or L-shaped) is attached to the mirror frame 12 by a cap nut 24. A molded synthetic resin bracket 26 having a hollow threaded neck 28 integrally bound to an end thereof, receives the mirror bracket 22 through the neck 28 (see FIGS. 3 and 4). A nylon nut 29 threadably engages threaded neck 28 to firmly secure the mirror bracket 22 within the threaded neck 28.

Molded bracket 26 is preferably manufactured out of any of the synthetic resins (e.g. plastic polymers such as polyocetal, polyethylene, polypropylene, etc.) that would enable the mirror frame 12 and the attached mirror bracket 22 to break-away from the neck 28 when impacted by a relatively, generally stationary object (e.g. a person or the like) to protect the object from damage by the mirror frame 12 and mirror bracket 22. In a preferred embodiment of the invention, molded bracket 26 comprises a pair 30—30 of generally rectangular mating box-like members, each including a pair 32—32 of end walls and a pair 34—34 of side walls. An end wall 32 of each pair 30—30 of mating box-like members includes a protruding essentially hollow semi-cylindrical structure 36 defining a portion of the threaded neck 28. When the pair 30—30 of box-like members mate to form the molded bracket 26, the threads on semi-cylindrical structure 36—36 are aligned when the threaded neck 28 is formed. Each side wall 34 of each pair 30—30 of box-like members include a pair 38—38 of semi-circular grooves (see FIG. 3) such that when the pair 30—30 of box-like members mate, the semi-circular grooves align to form two circular apertures on each side of the molded bracket means 26. A rectangular face 40 of one 30 box-like member has a structure defining a plurality of apertures 42 for receiving bolts (see dotted lines in FIG. 3) which threadably engage threaded openings on the inside of the other 30 box-like member (see FIG. 3, especially dotted lines).

An upper bracket 44 passes through one circular aperture on each side of the molded bracket 26 (see FIGS. 1, 2, 3 and 4) and attaches to an automobile 45, or the like. A lower bracket 46 passes through the other circular aperture on each side of the molded bracket 26 and attaches to the automobile 45 or the like underneath the upper bracket 44.

With continuing reference to the drawings for operation of the invention, the mirror bracket 22, having frame 12 attached thereto, is lodged within the threaded neck 28 of the molded bracket 26 and secured therein by nylon nut 29. When a generally stationary object or person is contacted by the combined mirror frame 12—bracket 22 as the automobile 45 is being driven, the combined mirror frame 12—bracket 22 breaks the threaded neck 28 to dislodge from the molded bracket 26 to protect the person or object from serious injury.

While the preferred form of the invention has been shown and suggested, it should be understood that suitable modifications, changes, substitutions and alterations may be made without departing from the invention's fundamental theme.

I claim:

1. A break-away rearview mirror comprising a mirror means, a mirror bracket means attached to said mirror means, a molded synthetic resin bracket means comprising a generally hollow structure having a hollow threaded neck for receiving therethrough said mirror bracket means and a pair of generally rectangular mating box-like members, each including a pair of end walls and a pair of side walls, an end wall of each pair of box-like members including a protruding essentially hollow semi-cylindrical structural defining a portion of said threaded neck such that when said box-like members mate, the threads on each portion of said threaded neck are aligned when the threaded neck is formed, a means for attaching said mirror bracket means to said molded bracket means to hold said mirror means in an upright position, and a mounting bracket means connecting to said molded bracket means to mount said combined mirror means-mirror bracket means-molded bracket means on an automobile, truck, or the like, said mounting bracket means having a structural portion of same being encased within said synthetic resin bracket means, said combined mirror means-mirror bracket means breaking-away from said molded synthetic resin bracket means upon impact.

2. The break-away mirror of claim 1 wherein said molded synthetic resin bracket means comprises a structure having an opening for receiving said mirror bracket means.

3. The break-away mirror of claim 1 wherein the side walls of at least one of said pair of box-like members include a structure defining at least one semi-circular groove, said mounting bracket means lodging within said semi-circular grooves.

4. The break-away mirror of claim 1 wherein the side walls of each of said pair of box-like members include a structure defining at least one semi-circular groove such that when said box-like members mate, the semi-circular grooves align to form a circular aperture on each side of said molded bracket means wherethrough a structural portion of said mounting bracket means passes.

5. The break-away mirror of claim 1 wherein each side wall of said of said pair of box-like members include a structure defining two semi-circular grooves such that when said box-like members mate, the semi-circular grooves align to form two circular apertures on each side of said molded bracket means.

6. The break-away mirror of claim 5 wherein said mounting bracket means comprises an upper bracket and a lower bracket, said upper bracket passing through one circular aperture on each side of said molded bracket means and attached to said automobile, truck, or the like, said lower bracket passing through the other circular aperture on each side of said molded bracket means and attaching to the automobile, truck, or the like, underneath said upper bracket.

7. The break-away mirror of claim 6 wherein said means for attaching said mirror bracket means to said molded bracket means comprises a nylon nut threadably engaging said threaded neck.

8. The break-away mirror of claim 7 wherein said mirror means comprises a flat mirror and a convex mirror positioned contiguous to the end of said flat mirror, said convex mirror having a chord plane forming an angle of between about 1 degree and 10 degrees with the plane of the flat mirror.

* * * * *